(12) United States Patent
Mandal et al.

(10) Patent No.: US 7,685,467 B2
(45) Date of Patent: Mar. 23, 2010

(54) DATA SYSTEM SIMULATED EVENT AND MATRIX DEBUG OF PIPELINED PROCESSOR

(75) Inventors: Dipan Kumar Mandal, Bangalore (IN); Bryan Joseph Thome, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 941 days.

(21) Appl. No.: 11/413,406

(22) Filed: Apr. 27, 2006

(65) Prior Publication Data

US 2007/0294585 A1    Dec. 20, 2007

(51) Int. Cl.
G06F 11/00 (2006.01)
(52) U.S. Cl. ..................................... 714/29
(58) Field of Classification Search .............. 714/45, 714/12
See application file for complete search history.

(56) References Cited

U.S. PATENT DOCUMENTS

| | | | |
|---|---|---|---|
| 3,673,573 A * | 6/1972 | Smith ......................... | 714/45 |
| 5,539,911 A * | 7/1996 | Nguyen et al. ................ | 712/23 |
| 5,640,500 A * | 6/1997 | Taylor ......................... | 345/440 |
| 5,995,113 A * | 11/1999 | Mitchell et al. ............. | 345/440 |
| 6,289,021 B1 * | 9/2001 | Hesse ......................... | 370/409 |
| 7,093,108 B2 * | 8/2006 | Swaine ........................ | 712/227 |
| 2004/0078690 A1 * | 4/2004 | Kohashi ...................... | 714/38 |
| 2005/0289400 A1 * | 12/2005 | Kimura ....................... | 714/45 |
| 2006/0117229 A1 * | 6/2006 | Swaine et al. ................ | 714/45 |

* cited by examiner

*Primary Examiner*—Scott T Baderman
*Assistant Examiner*—Yair Leibovich
(74) *Attorney, Agent, or Firm*—Lawrence J. Bassuk; W. James Brady; Frederick J. Telecky, Jr.

(57) ABSTRACT

A method and/or a system of a processor-agnostic encoded debug architecture in a pipelined environment is disclosed. In one embodiment, a method of a processor includes processing an event specified by a data processing system coupled to the processor to determine a boundary of the event, generating a matrix having combinations of the event and other events occurring simultaneously in the processor, capturing an output data of observed ones of the event and other events, and applying the matrix to generate an encoded debug data of the output data. The method may also include determining which of the combinations are valid based on an architecture of the processor. The event may be a trace-worthy event whose output value cannot be reliably predicted in an executable file in the data processing system and/or a sync event that is specified by a user of the data processing system.

11 Claims, 9 Drawing Sheets

| TYPE 600 | SIMULTANEOUS 602 | EVENT NAME 604 | VALID? 606 | CODE 608 |
|---|---|---|---|---|
| TW | SYNC | REG REPEAT | Y | 00 |
| SYNC | — | BLOCK REPEAT | Y | 11 |
| TW | TW | EXCEPTION | Y | 01 |
| TIMING | — | BRANCH | N | — |

COLLISION MATRIX 110

FIGURE 6

DATA SYSTEM SIMULATED EVENT AND MATRIX DEBUG OF PIPELINED PROCESSOR

FIELD OF TECHNOLOGY

This disclosure relates generally to the technical fields of debugging of software and/or hardware technology and, in one example embodiment, to a method and/or a system of a processor-agnostic encoded debug-architecture in a pipelined environment.

BACKGROUND

A debugger may be a logic unit (e.g., a hardware and/or a software program) that is used to debug (e.g., to correct, repair, fix, etc.) other hardware/software programs. The other hardware/software programs may operate on a device (an integrated circuit) the debugger is running on, and/or may operate on a different device (e.g., a similar device, a dissimilar device, a software code, and/or an embedded processor, etc.).

A Digital Signal Processor (DSP) can be a special-purpose processor used in a digital signal processing application (e.g., an application having sources such as audio, video, weather satellites, earthquake monitors, etc.). The DSP may use a pipelining architecture to process data faster than a standard microprocessor (e.g., an Intel® Pentium®, etc.). By using the pipelining architecture, the DSP may provide simultaneous and/or parallel processing of overlapping operations by moving data and/or instructions into a conceptual pipe (e.g., stages of the conceptual pipe may be performed simultaneously). For example, while one instruction is being executed, the DSP may decode a next instruction.

Debugging the DSP may not work well (e.g., may cause a crash of an auxiliary peripheral, adding code to shut off the auxiliary peripheral may cause a change in a pipelining order, etc.) when the pipelining architecture is utilized in real-time data processing (e.g., an error such as a speckle may be only visible when a live-video is running, etc.). Furthermore, a large amount of data may need to be recorded, encoded, and/or exported to the debugger using a limited number of output pins on the DSP.

In addition, the debugger may need to be customized for different types of the DSP because of a wide variety of instructions that may be pipelined and the varying packet size of instructions. In each of the different types of the DSP, a large amount of storage may be required to perform the debugging because of the pipelined nature of various operations (e.g., storing output data of each operation may require a massive data buffer). Therefore, the debugging of different types of the DSP can be a difficult, time consuming, expensive, and/or frustrating process.

SUMMARY

A method and/or a system of a processor-agnostic encoded debug architecture in a pipelined environment is disclosed. In one aspect, a method of a processor includes processing an event specified by a data processing system coupled to the processor to determine a boundary of the event, generating a matrix having combinations of the event and other events occurring simultaneously in the processor, capturing an output data of observed ones of the event and other events, and applying the matrix to generate an encoded debug data of the output data.

The method may determine which of the combinations are valid based on an architecture of the processor. The event may be a trace-worthy event whose output value cannot be reliably predicted in an executable file in the data processing system and/or a sync event that is specified by a user of the data processing system. The encoded debug data may be serialized based on packet size across any number of different buffers to maximize utilization of a limited set of output pins. In addition, a timing data may be serialized with the encoded debug data in a separate buffer to provide clock data in a communication between the processor and the data processing system.

A first output of the trace-worthy event in the encoded debug data may have a different packet size than that of a second output of the sync event in the encoded debug data. The encoded debug data may be communicated to the data processing system based on a predetermined schedule (e.g., may specify that the second output of the sync event in the encoded debug data is communicated before the first output of the trace-worthy event in the encoded debug data).

In addition, progressive ones of a program-counter event data may be speculatively stored in advance of determining whether the program-counter event data is associated with the trace-worthy event and/or the sync event. The matrix may be generated from all corner cases of combinations of the event and other events occurring simultaneously in the processor. Furthermore the combinations of the event and other events occurring simultaneously in the processor may be evaluated to determine whether they are valid, and valid versions of the combinations of the event and other events may be encoded using a processor-agnostic encoding system that can operate in any number of a plurality of processors.

In another aspect, a method of a data processing system includes determining that a discontinuity data is a trace-worthy event, communicating the trace-worthy event to a pipelined processor, and decoding an output data associated with simultaneous occurrences of the trace-worthy event and other events in the pipelined processor based on a collision matrix formed from valid combinations of the trace-worthy event and other events. In addition, the method may include communicating a sync event whose parameters are specified by a user of a test data associated with the trace-worthy to the pipelined processor, and decoding a different output data associated with simultaneous occurrences of the trace-worthy event and the sync event in the pipelined processor based on the collision matrix.

In a further aspect, a system includes a processor to generate a matrix having combinations of an event and other events occurring simultaneously in the processor, to capture an output data of observed ones of the event and other events, and to apply the matrix to generate an encoded debug data of the output data; and a data processing system to propose the event and the other events to the processor based on at least one of a discontinuity modeling of a test data and a user request of a specific program counter response, and to decode the encoded debug data.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 6 is an exploded view of the collision matrix of the processor of FIG. 1, according to one embodiment.

Other features of the present embodiments will be apparent from the accompanying drawings and from the detailed description that follows.

DETAILED DESCRIPTION

A method and/or a system of a processor-agnostic encoded debug architecture in a pipelined environment is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method of a processor includes processing an event specified by a data processing system coupled to the processor to determine a boundary of the event, generating a matrix having combinations of the event and other events occurring simultaneously in the processor, capturing an output data of observed ones of the event and other events, and applying the matrix to generate an encoded debug data of the output data.

In another embodiment, a method of a data processing system includes determining that a discontinuity data is a trace-worthy event, communicating the trace-worthy event to a pipelined processor, and decoding an output data associated with simultaneous occurrences of the trace-worthy event and other events in the pipelined processor based on a collision matrix formed from valid combinations of the trace-worthy event and other events. In addition, the method may include communicating a sync event whose parameters are specified by a user of a test data associated with the trace-worthy to the pipelined processor, and decoding a different output data associated with simultaneous occurrences of the trace-worthy event and the sync event in the pipelined processor based on the collision matrix.

In yet another embodiment, a system includes a processor to generate a matrix having combinations of an event and other events occurring simultaneously in the processor, to capture an output data of observed ones of the event and other events, and to apply the matrix to generate an encoded debug data of the output data; and a data processing system to propose the event and the other events to the processor based on at least one of a discontinuity modeling of a test data and a user request of a specific program counter response, and to decode the encoded debug data.

Figure 1:
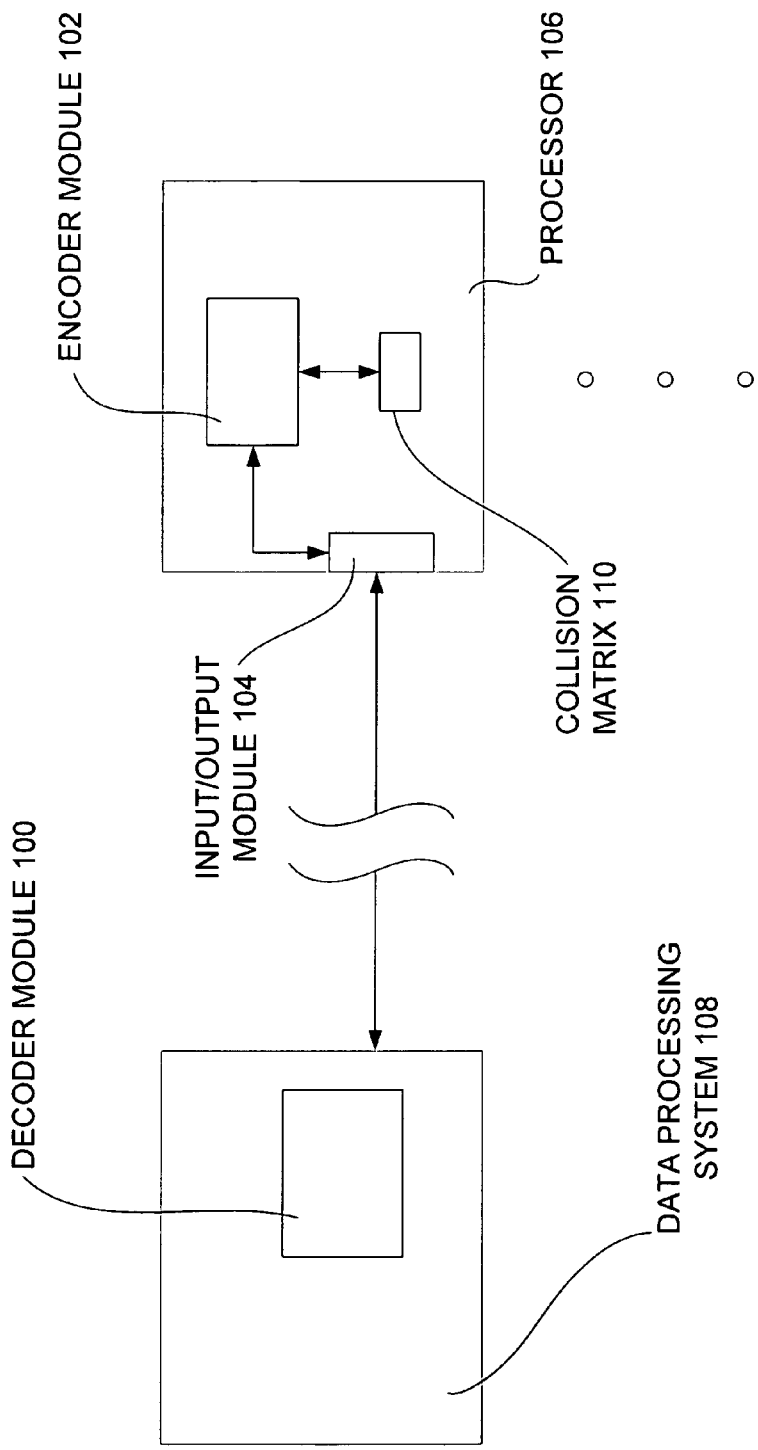
FIG. 1 is a block diagram of a data processing system having a decoder module communicating with a processor having an encoder module and a collision matrix, according to one embodiment.

FIG. 1 is a block diagram of a data processing system 108 having a decoder module 100 communicating with a processor 106 having an encoder module 102 and a collision matrix 110, according to one embodiment. The processor 106 is also illustrated as having an input/output module (an I/O module 104). The I/O module 104 may include a set of output pins, which may be limited in number when the processor 106 is physically small (e.g., there may be only 280 output pins when the processor is 2 inches by 2 inches in size). The processor 106 may be a Digital Signal Processor (DSP) that is used in real-time applications (e.g., mobile, video, scientific, audio, etc.) in one embodiment (e.g., such as a processor from the TMS320™ series DSPs by Texas Instruments®).

Figure 2:
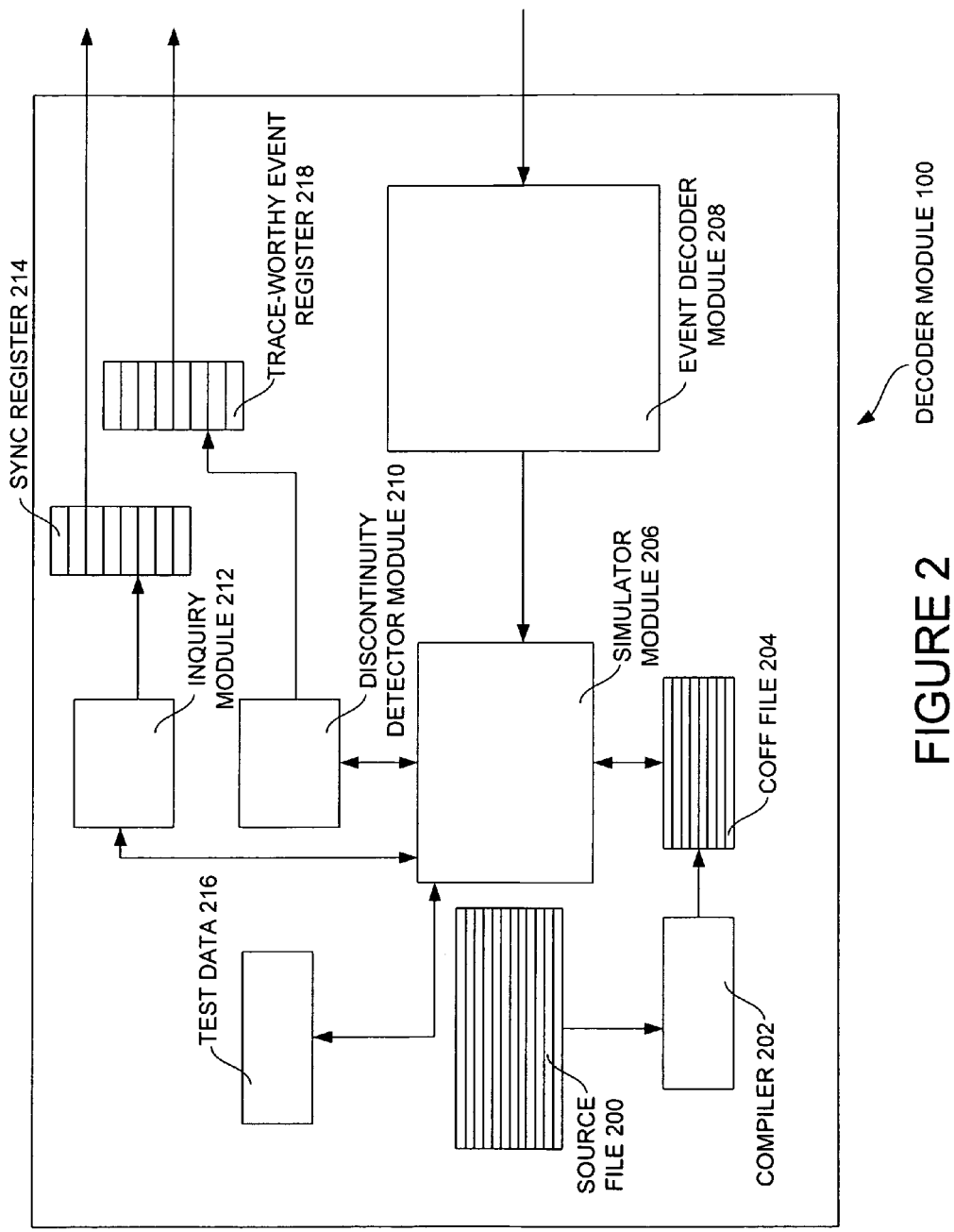
FIG. 2 is an exploded view of the decoder module of the data processing system of FIG. 1, according to one embodiment.

FIG. 2 is an exploded view of the decoder module 100 of the data processing system 108 of FIG. 1, according to one embodiment. The decoder module 100 of FIG. 2 is illustrated as including a source file 200, a compiler 202, a COFF file 204 (Common Object File Format), a simulator module 206, an event decoding module 208, a discontinuity detector module 210, an inquiry module 212, a sync register 214, a test data 216, and/or a trace-worthy event register 218.

The source file 200 may be a programming code (e.g., a software algorithm) that simulates operations of the processor 106. The source file 200 may be converted into the COFF file 204 using the compiler 202. For example, the compiler 202 may be a computer program that translates operations written in one computer language (e.g., a language of the source file 200) to another computer language (e.g., a language of the COFF file 204).

The COFF file 204 may be an executable file which simulates logic operations of the processor 106, according to one embodiment. The simulator module 206 may model (e.g., simulate) whether the test data 216 (e.g., a real-time application such as a video capture application) will operate (e.g., work without bugs, errors, etc.) on the processor 106 by executing the test data 216 using the COFF file 204. When the simulator module 206 is able to recreate a program counter event solely using the COFF file 204 (e.g., a software simulation of the processor 106 using the COFF file 204 may be enough to reliably determine that the test data 216 will operate properly on the processor 106), the simulator module 206 may allow a user (e.g., a programmer, a engineer, a technician, etc.) to debug the test data 216 without physical calls to the processor 106 (e.g., a hardware device).

In contrast, when the simulator module 206 is unable to recreate the program counter event solely using the COFF file 204, the simulator module 206 will use the discontinuity detector module 210 to create a log of trace-worthy events. The log of trace-worthy events may be stored in a trace-worthy event register 218. For example, a trace-worthy event may be a discontinuity in a programming code and/or an execution flow complexity that is difficult to simulate using the COFF file 204 (e.g., a register repeat, a block repeat, a branch command, an exception, a conditional execution, etc.). The trace-worthy event register 218 may then be communicated (e.g., through a physical link and/or through a network) from the decoder module 100 of the data processing system 108 to the processor 106.

In addition, the user (e.g., the programmer, the engineer, the technician, etc.) may wish to also evaluate (e.g., test, debug, etc.) the processor 106's reaction at other stages in the test data 216's execution in the processor 106 (e.g., for verification reasons). As such, the user may utilize the inquiry module 212 to populate (e.g., manually and/or automatically) the sync register 214 (e.g., the sync register 214 may include specific program counter events that the user seeks to observe in the processor 106) with identifiers (e.g., meta-data) of specific program counter events where the processor 106 should also provide an output data to the user. Similar to the trace-worthy event register 218, the sync register 214 may also be communicated (e.g., through a physical link and/or through a network) from the decoder module 100 of the data processing system 108 to the processor 106.

It should be noted that a program counter event may be an instruction pointer event such as one that indicates where the processor 106 is in its instruction sequence. For example, the program counter event may be automatically incremented for each instruction cycle so that instructions are normally retrieved sequentially from memory. Certain instructions, such as branches and subroutine calls, may interrupt a sequence by placing a new value in the program counter.

The event decoding module 208 as illustrated in FIG. 2 may be used to decode data received from the processor 106 having program counter event and/or output information corresponding to the trace-worthy event register 218 and/or the sync register 214 inquiries made by the simulator module 206 of the data processing system 108. In one embodiment, the event decoding module 208 includes all and/or a substantial portion of the logic used to create the encoding (e.g., the event decoding module 208 may include a version of the collision matrix 110 of FIG. 1).

Figure 3:
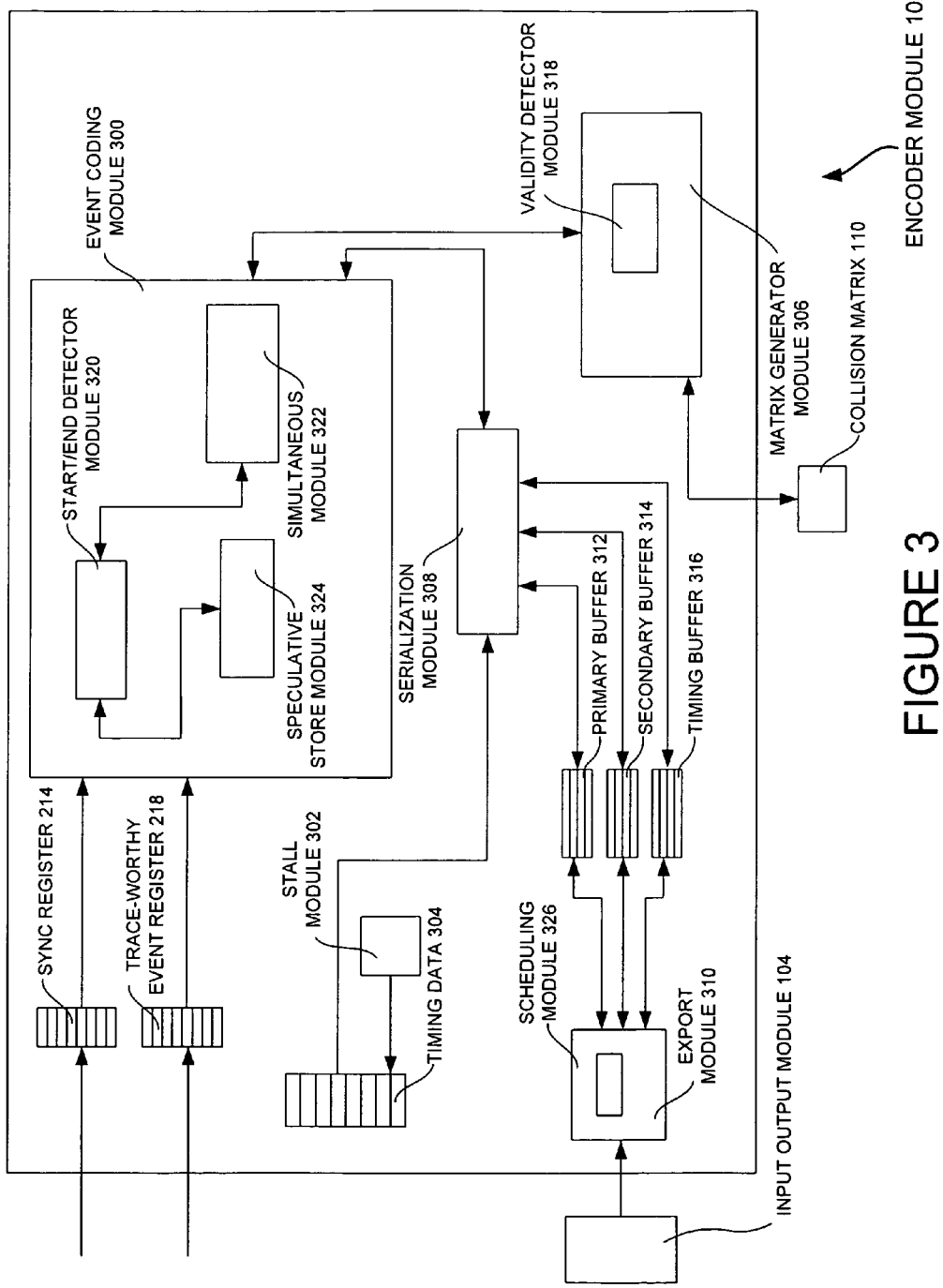
FIG. 3 is an exploded view of the encoder module of the processor of FIG. 1, according to one embodiment.

FIG. 3 is an exploded view of the encoder module 102 of the processor 106 of FIG. 1, according to one embodiment. In one embodiment, the encoder module 102 operates in real-time, at a clock speed equal to the processor 106. The encoder module 102 is illustrated as having an event coding module 300, a stall module 302, a timing data 304, a matrix generator module 306, a serialization module 308, an export module 310, and a set of buffers 312-316.

First, the event coding module 300 of the processor 106 (e.g., as illustrated in FIG. 1) may receive the trace-worthy event register 218 and/or the sync register 214 from the data processing system 108 (e.g., as illustrated in FIG. 1). The event coding module 300 may use a start/end detector module 320 to determine a beginning and/or an end of a program counter event associated with each trace-worthy event (e.g., in the trace-worthy event register 218) and/or each sync event (e.g., in the sync register 214).

Then a speculative store module 324 of the event coding module 300 of FIG. 3 may temporarily store/capture individual program counter events in anticipation of them being trace-worthy events and/or sync events (e.g., the event coding module 300 may speculatively store real-time scenarios so as to not fall behind when an event is to be captured). In one embodiment, sync events and/or trace-worthy events may be particular types of program counter events (e.g., a particular program counter event may be associated with a trace-worthy event and a sync event).

A simultaneous module 322 of the event coding module 300 as illustrated in FIG. 3 may be used in deeply-pipelined versions of the processor 106 (e.g., such as the DSP). The simultaneous module 322 may be used to encode sync events and/or trace-worthy events that occur simultaneously and/or concurrently in the processor 106's pipelining execution cycle. For example, the simultaneous module 322 may be used in conjunction with pipelining to improve performance by reducing an idle time of each piece of mathematical circuitry (e.g., an ALU) in the processor 106.

As such, the simultaneous module 322 may be used to encode sync events and/or trace-worthy events that occur at the same time in pipelined versions of the processor 106. In this embodiment, the processor 106 may be subdivided to various functional units of different stages (e.g., relatively independent components) which can each be working on a different task. Stages may be ordered in sequence with the output of each stage feeding the input of a stage after it. Because each stage may only be a small part of the overall computation, each function may take only a short time, and an overall clock speed and/or encoding accuracy may be increased when the simultaneous module 322 is used to encode sync-events and trace-worthy events that occur simultaneously.

An encoding system (e.g., scheme) used by the event coding module 300 of FIG. 3 (e.g., in the encoder module 102 of the processor 106 of FIG. 1) may involve generating and/or referencing the collision matrix 110 (e.g., as illustrated in FIG. 1). Particularly, the matrix generator module 306 of FIG. 3 may be used by the event coding module 300 to create the collision matrix 110 (e.g., an exploded view of the collision matrix is illustrated in FIG. 6).

The matrix generator module 306 may create every combination of the sync events and/or the trace-worthy events occurring in parallel and/or simultaneously in the processor 106, according to one embodiment. For example, the matrix generator module 306 may consider the physical architecture, the test data 216 (e.g., of the decoder module 100 as described in FIG. 2), and/or pipelining structure of the processor 106 to create a model of every possible occurrence of events happening simultaneously. To minimize the amount of combinations, the matrix generator module 306 may utilize a validity detector module 318 to ensure that a particular combination will actually work in the processor 106 (e.g., given the processor 106's physical constraints). Only combinations that are valid may be encoded in the collision matrix 110. The collision matrix 110 may best understood with reference to FIG. 6.

FIG. 6 is an exploded view of the collision matrix 110 of the data processing system of FIG. 1, according to one embodiment. The collision matrix 110 in FIG. 6 includes a type field 600, a simultaneous field(s) 602, an event name field 604, a valid field 606, and/or a code field 608. The type field indicates a type of event being encoded. For example, illustrated in FIG. 6 are two trace-worthy events ('TW'), a sync event ('SYNC'), and a timing event ('TIMING') that may be encoded. The simultaneous field(s) 602 indicates what events occur simultaneously with an event identified in the type field 600 (e.g., there may be any number of simultaneous fields). For example, in FIG. 6, one 'TW' event is illustrated as occurring simultaneously with a 'SYNC' event and a different 'TW' event is illustrated as occurring with another 'TW' event.

The event name field 604 indicates the name of a particular type of event. For example, illustrated in FIG. 6 are a Register Repeat event, a Block Repeat event, an Exception event, and/or a Branch event respectively. Each of these events in the event name field 604 may be associated with different types of trace-worthy events ('TW') and/or sync events ('SYNC'). The valid field 606 indicates whether a particular type of event is valid given an architecture constraint of the processor 106 (e.g., a physical design constraint). For example, the valid field 606 may be populated using the validity detector module 318 (e.g., as described in FIG. 3).

The code field 608 may include any type of binary, alphanumeric, and/or logical code that helps to minimize a number of data bits required to capture an output associated with the particular event type when the processor 106 executes the trace-worthy events in the trace-worthy event register 218 (as described in FIG. 2 and in FIG. 3), and/or the sync events in the sync register 214 (as described in FIG. 2 and in FIG. 3). In one embodiment, the code field 608 includes encrypted data (e.g., 64 bit encrypted data). In another embodiment, the code field 608 includes binary data that is generated and maintained only for valid versions of simultaneous events verified by the validity detector module 318 of FIG. 3.

For example, in FIG. 6, there are '00', '11', and '01' codes indicated for the Register Repeat, Block Repeat, and Exception events (e.g., in the event name field 604) respectively. However, there is no code indicated for the Branch event (in the event name field 604) because it was declared to be invalid (e.g., as illustrated with an 'N' in the valid field 606 corresponding to the Branch event).

Referring back to FIG. 3, the matrix generator module 306 provides the collision matrix to the event coding module 300. The event coding module 300 may generate codes in the collision matrix (e.g., values in the code field 608) based on any type of encoding and/or encrypting algorithm. Then, the event coding module 300 may use the start/end detector module 320, the simultaneous module 322, and/or the speculative store module 324 to apply codes in the collision matrix 110 to specific trace-worthy events in the trace-worthy event register 218 and/or to specific sync events in the sync register 214.

Figure 5:
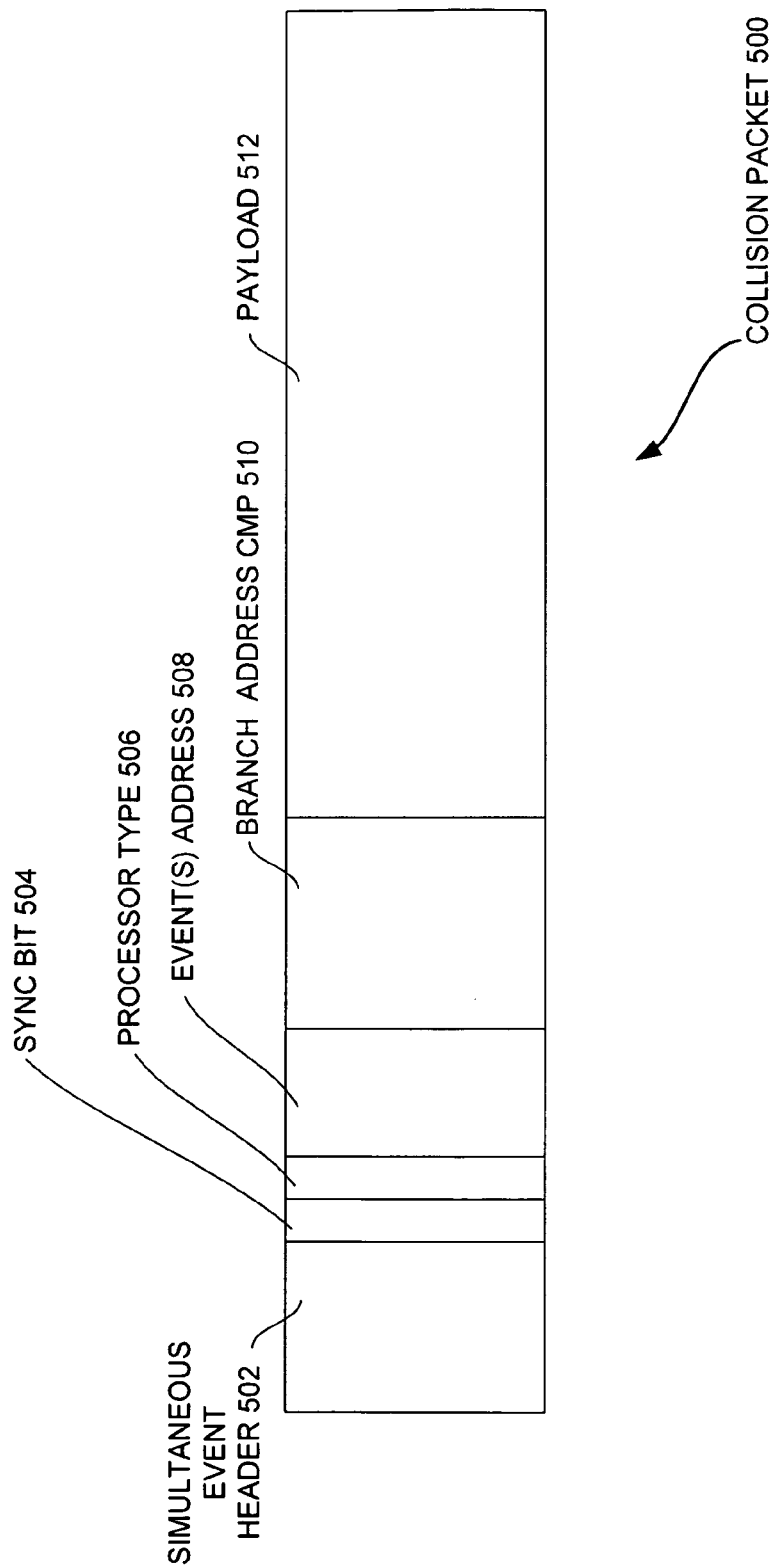
FIG. 5 is a structural view of a collision packet, according to one embodiment.

Next, the serialization module 308 may receive encoded packets (e.g., such as a collision packet 500 as illustrated in FIG. 5) from the event coding module 300. The serialization module 308 may separate packets based on packet size and/or length into various different buffers (e.g., a primary buffer 312, a secondary buffer 314, and/or a timing buffer 316). The different buffers may be First-In-First-Out (FIFO) buffers in one embodiment. For example, a simultaneous occurrence of multiple trace-worthy events may be stored in the primary buffer 312. In contrast, a simultaneous occurrence of a trace-worthy event with a sync event may be stored in the secondary buffer.

In addition, the serialization module 308 may consult the stall module 302 that generates the timing data 304 (e.g., a stall data) to make sure that alignment of various events can be reconstructed. The timing data 304 may be stored in a separate buffer, the timing buffer 316. By serializing collision packets and having the timing buffer in the separate buffer, the serialization module 308 ensures that only a limited number of pins (e.g., pins of the I/O module 104) can quickly and/or reliably transfer data between the encoder module 102 to the data processing system 108 (e.g., as illustrated in FIG. 1).

Next, the export module 310 may receive the data from the primary buffer 312, the secondary buffer 314, and/or the timing buffer 316. The export module 310 may utilize a scheduling module 326 to decide when to send out particular collision packets (e.g., encoded packets) to the data processing system 108. The scheduling module 326 may determine that simultaneously occurring events (e.g., sync events and/or trace-worthy events) have a higher priority than those events that are not simultaneously occurring. In addition, the scheduling module 326 may utilize a pipelining architecture (e.g., similar to the pipelining architecture used in general functions of the processor 106) to maximize the throughput and bandwidth of connectors (e.g., pins) of the i/o module 104.

Figure 4:
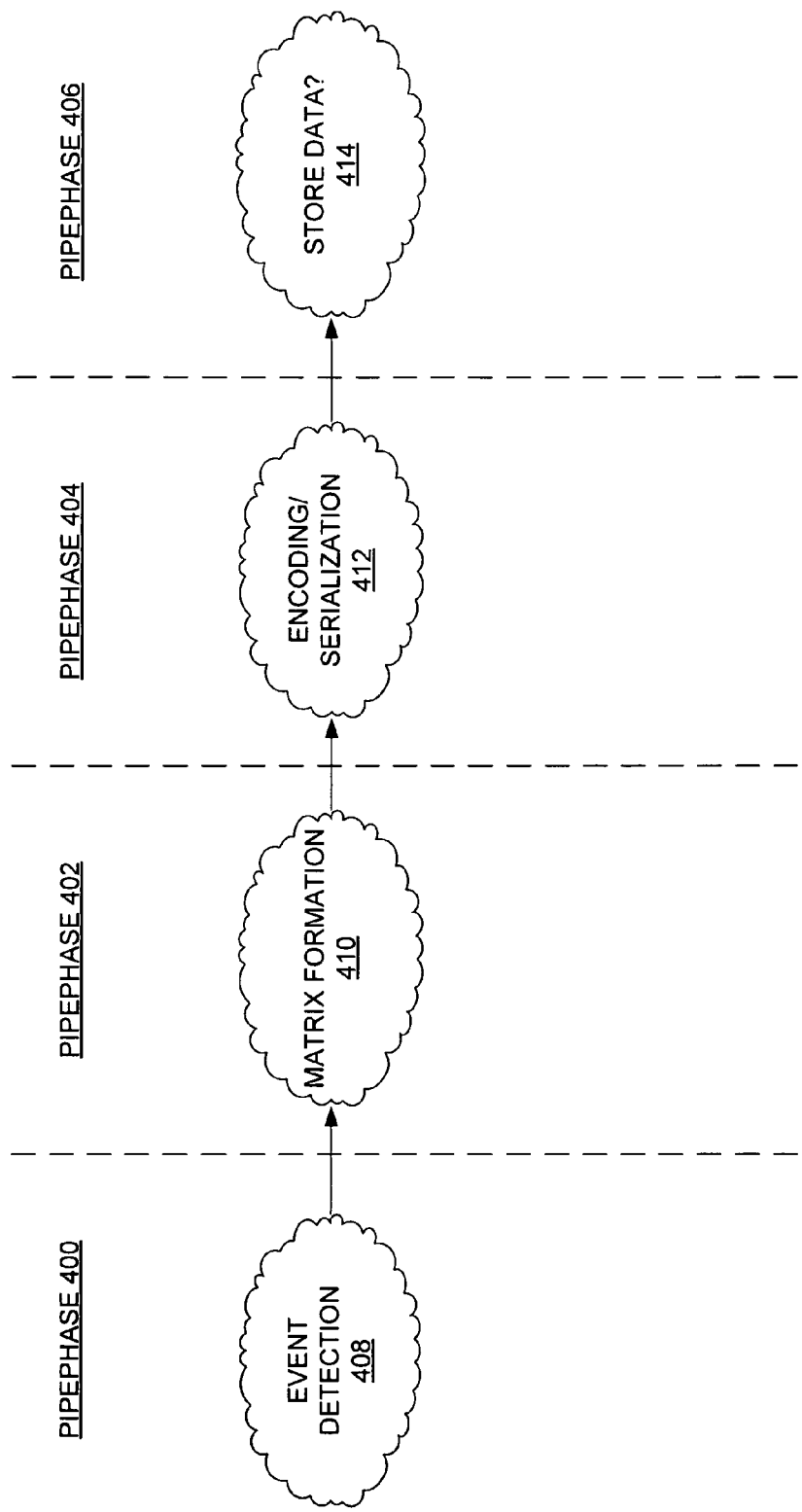
FIG. 4 is a phase diagram of event detection, matrix formation, encoding, and serialization, according to one embodiment.

FIG. 4 is a phase diagram of an event detection 408, a matrix formation 410, encoding and serialization 412, and a decision whether to store data 414, according to one embodiment. Particularly, FIG. 4 illustrates four pipe phases (e.g., logical stages of operations). A first pipephase 400 involves the event detection 408. The event detection 408 may involve an interaction between the data processing system 108 and the processor 106 of FIG. 1. For example, during the event detection 408 pipephase, the simulator module 206 (e.g., as illustrated in FIG. 2) may determine a set of discontinuity events using the discontinuity detector module 210 (e.g., as illustrated in FIG. 2). In addition, a set of sync events may be populated using the inquiry module 212 (e.g., as illustrated in FIG. 2) during this phase. In addition, various registers may be populated and transmitted to from the data processing system 108 to the processor 106 during this phase (e.g., as illustrated in FIG. 1).

A second pipephase 402 involves the matrix formation 410. During the second pipephase 402, the event coding module 300 (e.g., as illustrated in FIG. 3) may communicate with the matrix generator module 306 to generate, analyze, and/or evaluate all possible combinations of simultaneous events that might occur in a deeply-pipelined version of the processor 106 (e.g., the DSP). During this phase, the matrix generator module 306 (e.g., as illustrated in FIG. 3) may validate that particular ones of the combinations are valid and/or possible using the validity detector module 318.

A third pipephase 404 involves encoding and serialization 412 of trace-worthy events and/or sync events. During the third pipephase 404, the event coding module 300 (e.g., as described in FIG. 3) may create codes (e.g., binary, encrypted, hexadecimal, etc.) for valid versions of the various combinations identified by the matrix generator module 306. These codes may use any common encoding algorithm such as JPEG, Huffman encoding, etc. Then, the coded data may be serialized by the serialization module 308 (e.g., as illustrated in FIG. 3), and organized into a series of buffers. The timing data 304 may be encoded and/or serialized in addition to sync events and/or trace-worthy events during the third pipephase 404.

A fourth pipephase 406 involves a decision whether to store data 414. The fourth pipephase 406 may involve determining when and/or how events captured speculatively (e.g., using the speculative store module 324) are to be stored and/or discarded. For example, if a particular program count event is not proximate to the trace-worthy event after a threshold parameter of time, data may be deleted from memory (e.g., for the primary buffer 312, the secondary buffer 314 and/or the timing buffer 316).

FIG. 5 is a structural view of a collision packet 500, according to one embodiment. While FIG. 5 is one possible version of the collision packet 500, alternate embodiments may have different configurations. In FIG. 5, the collision packet 500 is illustrated as including a simultaneous event header 502, a sync bit 504, a processor type 506, an event(s) address data 508, a branch address command 510, and/or a payload 512. The simultaneous event header 502 may indicate how many, where, and/or what type of simultaneous event is found in a particular payload based on an architectural constraint of the processor 106. The sync bit 504 may indicate whether the payload is associated with a sync event data. If there is no sync bit 504, the collision packet 500 may be associated with a trace-worthy event data, according to one embodiment (e.g., sync event data collision packets may include one extra bit, so as to provide for clarity and/or differentiation during serialization of data).

The processor type 506 data may include information about a particular type of processor 106 that the encoder module 102 is operating on (e.g., as illustrated in FIG. 1). In one embodiment, the encoder module 102 may operate on a variety of different processor types (e.g., ASICs, DSPs, FPGAs, etc.). By designing a uniform encoding scheme using the collision matrix, a user (e.g., a chip designer) may be able to reuse both the encoder module 102 and/or the decoder module 100 on a variety of different processors (e.g., different types of the processor 106 as illustrated in FIG. 1).

The event(s) address data 508 may include information about a physical location and/or identifier of a type of event within the payload 512. For example, referring to FIG. 6, the event(s) address data 508 may include information about a location of an event named in the event name field 604 as described in FIG. 6. The branch address command 510 may include information about a branch location where data may be found according to one embodiment. For example, the branch address command 510 may include information about conditional jump and/or departure from the implicit and/or declared order in which instructions are being executed. Lastly, the payload 512 may include output information resulting from operating various trace-worthy events and/or sync events on the processor 106. For example, the payload 512 may include specific register and/or block data associated with each program counter event associated with a trace-worthy event occurring in the timing data.

Figure 7:
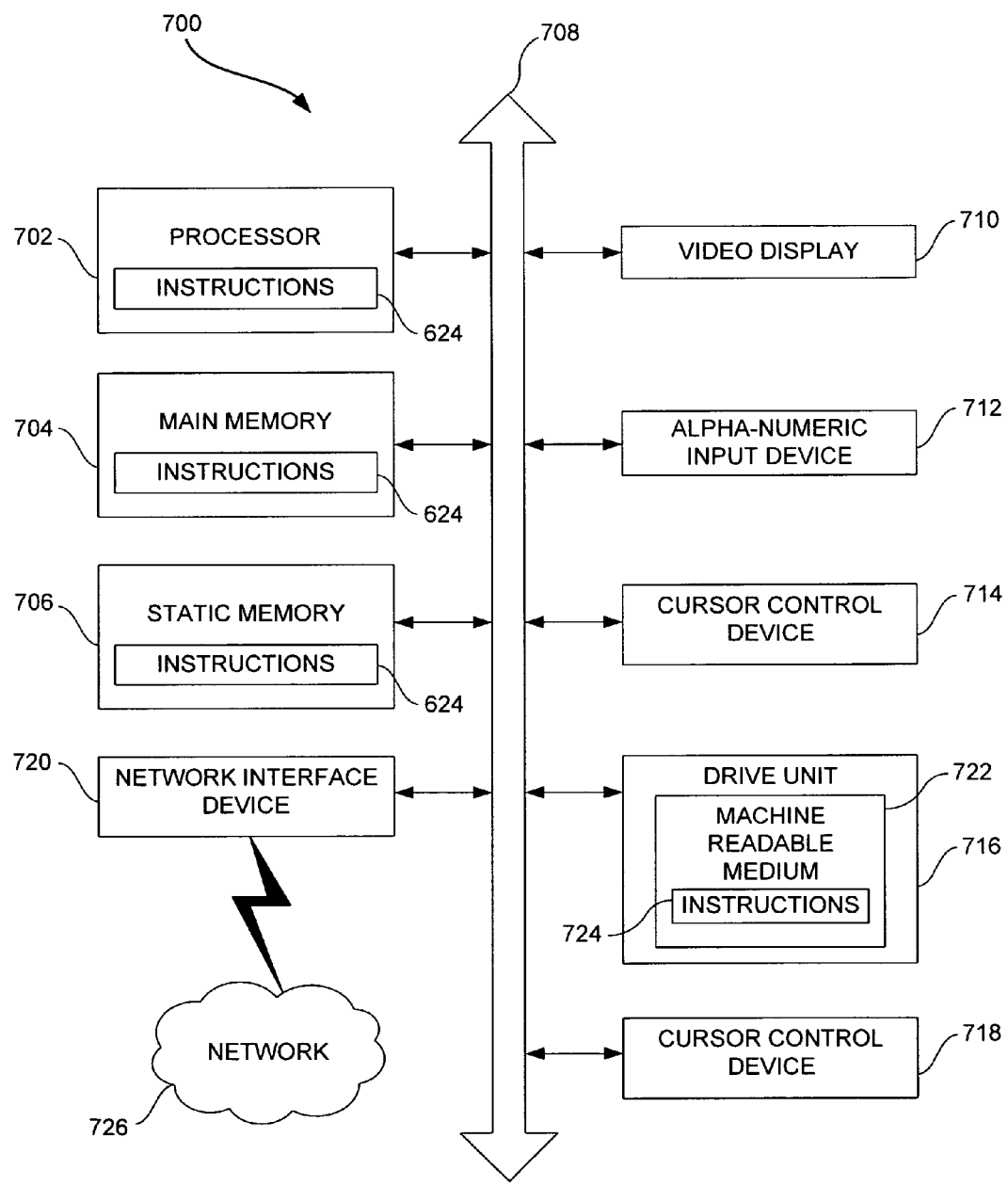
FIG. 7 is a diagrammatic representation of a data processing system capable of processing a set of instructions to perform any one or more of the methodologies herein, according to one embodiment.

FIG. 7 shows a diagrammatic representation of a machine in the example form of a computer system 700 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The computer system 700 includes a processor 702 (e.g., a central processing unit (CPU) a graphics processing unit (GPU) and/or both), a main memory 704 and a static memory 706, which communicate with each other via a bus 708. The computer system 700 may further include a video display unit 710 (e.g., a liquid crystal display (LCD) and/or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies and/or functions described herein. The software 724 may also reside, completely and/or at least partially, within the main memory 704 and/or within the processor 702 during execution thereof by the computer system 700, the main memory 704 and the processor 702 also constituting machine-readable media.

The software 724 may further be transmitted and/or received over a network 726 via the network interface device 720. While the machine-readable medium 722 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 8:
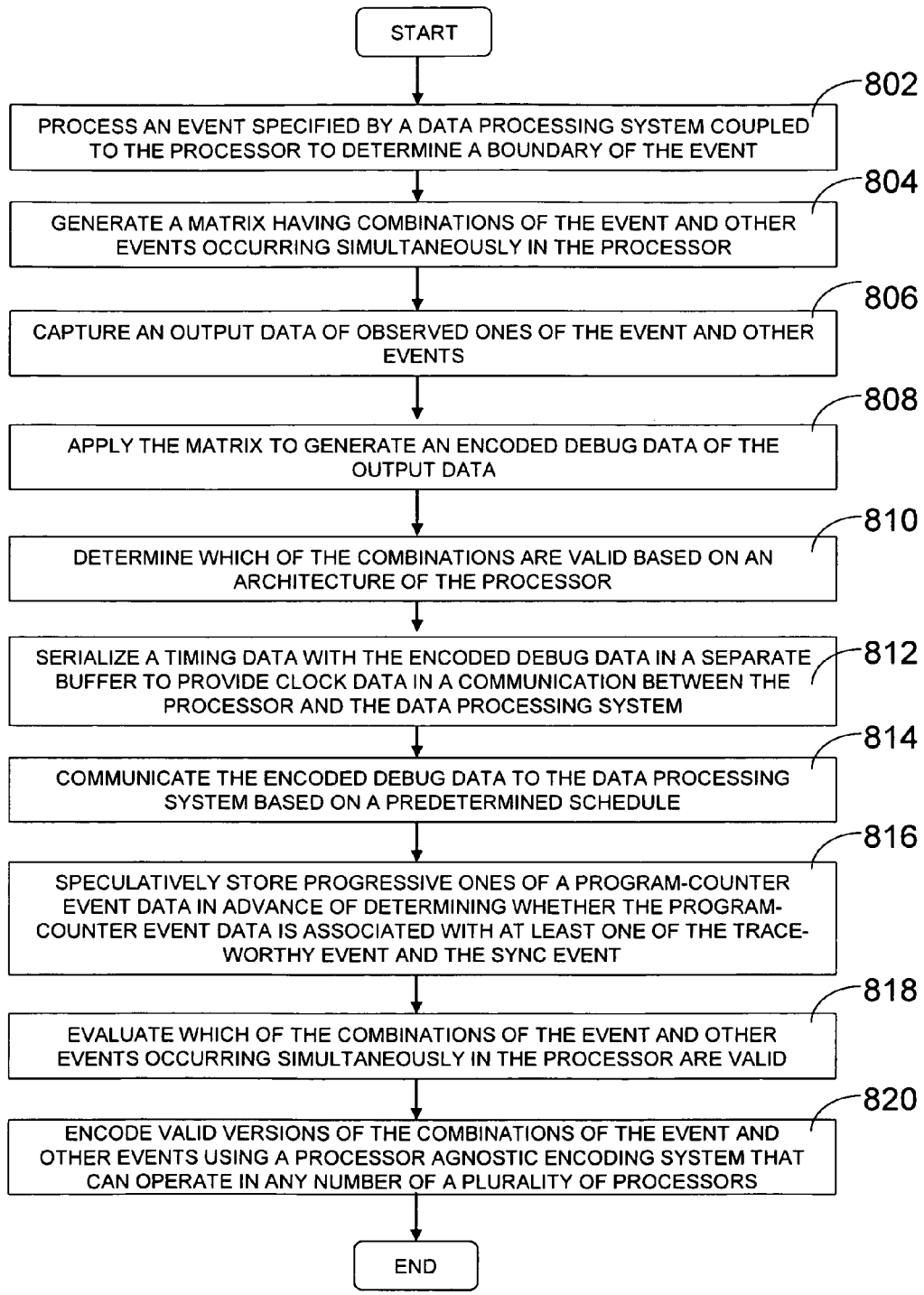
FIG. 8 is a flow chart of a processor that generates a matrix having combinations of events occurring simultaneously in the processor, and applies the matrix to generate an encoded debug data, according to one embodiment.

FIG. 8 is a flow chart of a processor (e.g., the processor 106 as illustrated in FIG. 1) that generates a matrix (e.g., the collision matrix 110 of FIG. 1) having combinations of events occurring simultaneously in the processor (e.g., as described in FIG. 6), and applies the matrix to generate an encoded debug data, according to one embodiment. In operation 802, an event (e.g., a trace-worthy event whose output value cannot be reliably predicted in an executable file in the data processing system and/or a sync event that is specified by a user of the data processing system) specified by a data processing system (e.g., the data processing system 108 of FIG. 1) coupled to the processor (e.g., the processor 106 of FIG. 1) may be processed (e.g., analyzed) to determine a boundary (e.g., where a program counter event starts and/or ends) of the event.

In operation 804, a matrix (e.g., the collision matrix 110 of FIG. 1) having combinations of the event and other events (e.g., trace-worthy events and/or sync events) occurring simultaneously (e.g., occurring in parallel) may be generated in the processor (e.g., the processor 106 of FIG. 1). In one embodiment, the matrix may be generated from all corner cases (e.g., all different variations using a robust methodology of encoding) of combinations of the event and other events occurring simultaneously in the processor (e.g., the processor 106 of FIG. 1). In operation 806, an output data of observed ones of the event and other events may be captured (e.g., using the event coding module 300 of FIG. 3).

In operation 808, the matrix may be applied (e.g., the collision matrix 110 of FIG. 1 may be applied to observed events) to generate an encoded debug data of the output data. In operation 810, a determination of which of the combinations is valid may be made based on an architecture (e.g., a physical layout and/or design constraint) of the processor. Then, the encoded debug data may be serialized based on packet size (e.g., and/or specific identifier information in the packets) across a plurality of different buffers (e.g., such as the buffers 312-316 as illustrated in FIG. 3) to maximize utilization of a limited set of output pins (e.g., output pins of the i/o module 104). In one embodiment, a first output (e.g., an output in the primary buffer 312 of FIG. 3) of the trace-worthy event in the encoded debug data may have a different packet size than that of a second output (e.g., an output in the secondary buffer 314 of FIG. 3) of the sync event in the encoded debug data.

Next, in operation 812, a timing data may be serialized with the encoded debug data (e.g., the timing data 304 created by the stall module 302 of FIG. 3) in a separate buffer (e.g., the timing buffer 316 of FIG. 3) to provide clock data (e.g., timing information) in a communication between the processor (e.g., the processor 106 of FIG. 1) and the data processing system (e.g., the data processing system 108 of FIG. 1). In operation 814, the encoded debug data may be communicated (e.g., transferred) to the data processing system based on a predetermined schedule (e.g., the predetermined schedule may specify that the second output of the sync event in the encoded debug data is communicated before the first output of the trace-worthy event in the encoded debug data).

Then, in operation 816, progressive ones of a program-counter event data may be speculatively stored in advance of determining whether the program-counter event data is associated with at least one of the trace-worthy event (e.g., in the trace-worthy event register 218 of FIG. 3) and the sync event (e.g., in the sync register 214 of FIG. 3). Then, in operation 818, an evaluation may be made of which of the combinations of the event and other events occurring simultaneously in the processor are valid (e.g., using the validity detector module 318 of FIG. 3). In operation 820, valid versions of the combinations of the event and other events may be encoded using a processor agnostic encoding system (e.g., created by the event coding module 300 of FIG. 3) that can operate in any number of a plurality of processors (e.g., different DSPs, ASICS, etc.).

Figure 9:
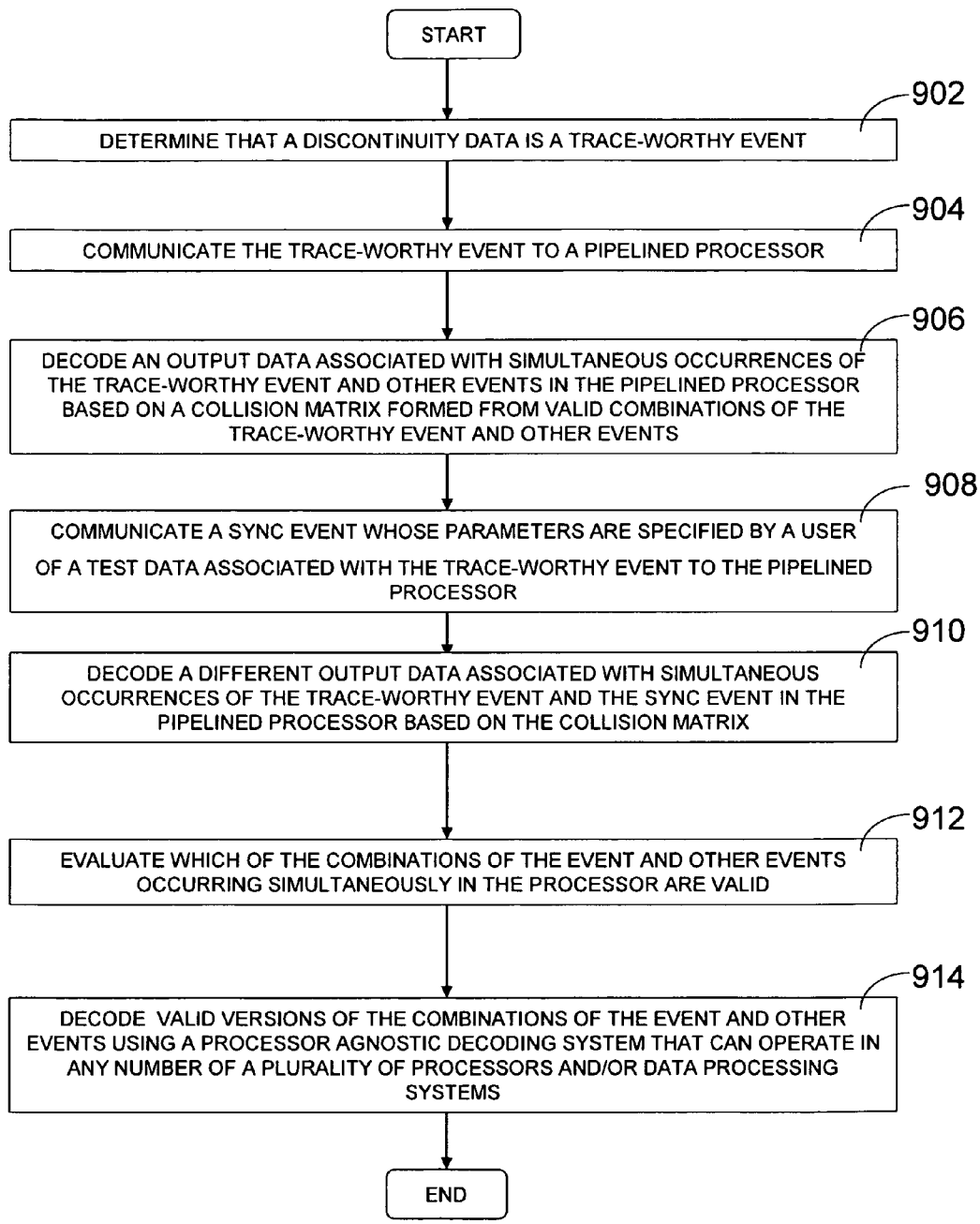
FIG. 9 is a flow chart of a method of a data processing system that determines that a discontinuous data is a trace-worthy event, communicates the trace-worthy event to a pipelined processor, and decodes an output data based on a collision matrix, according to one embodiment.

FIG. 9 is a flow chart of a method of a data processing system (e.g., the data processing system 108 of FIG. 1) that determines that a discontinuous data is a trace-worthy event (e.g., using the discontinuity detector module 210 of FIG. 2), communicates the trace-worthy event to a pipelined processor (e.g., the DSP version of the processor 106), and decodes an output data based on a collision matrix (e.g., using the event decoding module 208 of FIG. 2), according to one embodiment. In operation 902, it is determined that a discontinuity data is a trace-worthy event (e.g., using the simulator module 206). In operation 904, the trace-worthy event may be communicated to a pipelined processor (e.g., as previously described in FIG. 2).

In operation 906, an output data associated with simultaneous occurrences of the trace-worthy event and other events in the pipelined processor may be decoded (e.g., using the event decoding module 208) based on a collision matrix (e.g., the collision matrix 110 of FIG. 1) formed from valid combinations of the trace-worthy event and other events. Then, in operation 908, a sync event whose parameters are specified by a user of a test data associated with the trace-worthy event may be communicated to the pipelined processor (e.g., DSP versions of the processor 106 of FIG. 1).

In operation 910, a different output data associated with simultaneous occurrences of the trace-worthy event and/or the sync event in the pipelined processor may be decoded (e.g., using the event decoding module 208 of FIG. 2) based on the collision matrix (e.g., the collision matrix 110 may be formed in the processor 106 and communicated to the data processing system 108 for decoding purposes). Then, in operation 912, which of the combinations of the event and other events (e.g., the trace-worthy events and/or the sync events) occurring simultaneously in the processor (e.g., the processor 106) are valid may be evaluated (e.g., there may be a validity simulator in the simulator module 206 of FIG. 2 that replicates operations of the validity detector module 318 using the COFF file 204). In operation 914, valid versions of the combinations of the event and other events may be decoded using a processor agnostic decoding system (e.g., reverse of the processor agnostic encoding system of the processor 106) that can operate in any number of a plurality of processors (e.g., the processor 106) and/or data processing systems (e.g., the data processing system 108).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the decoder module 100, the encoder module 102, the i/o module 104, the simulator module 206, the discontinuity detector module 210, the inquiry module 212, the event decoding module 208, the event coding module 300, the stall module 302, the matrix generator module 306, the serialization module 308, the export module 310, the validity detector module 318, the start/end detector module 320, the simultaneous module 322, the speculative store module 324, and/or the scheduling module 326 may be enabled using a decoder circuit, an encoder circuit, an input/output circuit, a simulator circuit, a discontinuity detector circuit, an inquiry circuit, an event decoding circuit, an event coding circuit, a stall circuit, a matrix generator circuit, a serialization circuit, an export circuit, a validity detector circuit, a start/end detector circuit, a simultaneous circuit, a speculative store circuit, and/or a scheduling circuit using transistors, logic gates, and electrical circuits (e.g., application specific integrated ASIC circuitry) using a server circuit, a client circuit, a content circuit, a data analyzer circuit, a rules circuit, a configurator circuit, a simultaneous display circuit, a configuration requestor circuit, a relationship circuit, a nesting generator circuit, a configurator circuit, a reverse configurator circuit, a identification generator circuit, and/or a model generator circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of debugging a pipelined processor comprising:
  A. processing a simulated event detected by a data processing system to determine a boundary of the simulated event, the processing including determining a set of simulated events using a module in the data processing system and transmitting information concerning the simulated events from the data processing system to the pipelined processor;
  B. generating in the pipelined processor a matrix having combinations of the simulated event and other events occurring simultaneously in the pipelined processor, the generating including generating, analyzing, and evaluating combinations of simultaneous events that can occur in the pipelined processor;
  C. capturing output data of observed ones of the simulated event and other events; and D. applying the matrix to generate encoded debug data of the output data, the applying including encoding and serializing the output data and transmitting the output data from the pipelined processor to the data processing system.

2. The method of claim 1 further comprising determining which of the combinations are valid based on an architecture of the processor.

3. The method of claim 1 wherein the simulated event is at least one of a trace-worthy event whose output value cannot be reliably predicted in an executable file in the data processing system and a sync event that is specified by a user of the data processing system.

4. The method of claim 3 further comprising serializing the encoded debug data based on packet size across a plurality of different buffers to maximize utilization of a limited set of output pins.

5. The method of claim 4 wherein a first output of the trace-worthy event in the encoded debug data includes a different packet size than that of a second output of the sync event in the encoded debug data.

6. The method of claim 5 further comprising serializing a timing data with the encoded debug data in a separate buffer to provide clock data in a communication between the processor and the data processing system.

7. The method of claim 5 further comprising communicating the encoded debug data to the data processing system based on a predetermined schedule.

8. The method of claim 7 wherein the predetermined schedule specifies that the second output of the sync event in the encoded debug data is communicated before the first output of the trace-worthy event in the encoded debug data.

9. The method of claim 1 further comprising speculatively storing progressive ones of a program-counter event data in advance of determining whether the program-counter event data is associated with at least one of the trace-worthy event and the sync event.

10. The method of claim 1 wherein the matrix is generated from all corner cases of combinations of the event and other events occurring simultaneously in the processor.

11. The method of claim 1 further comprising evaluating which of the combinations of the event and other events occurring simultaneously in the processor are valid, and encoding valid versions of the combinations of the event and other events using a processor agnostic encoding system that can operate in any number of a plurality of processors.

* * * * *